No. 728,939. PATENTED MAY 26, 1903.
A. KRANTZ.
ANIMAL POKE.
APPLICATION FILED DEC. 18, 1902.
NO MODEL.

Witnesses.
A. H. Opsahl.
N. D. Kilgore.

Inventor.
August Krantz.
By his Attorneys.
Williamson Merchant

No. 728,939. Patented May 26, 1903.

UNITED STATES PATENT OFFICE.

AUGUST KRANTZ, OF SPRINGLAKE, MINNESOTA.

ANIMAL-POKE.

SPECIFICATION forming part of Letters Patent No. 728,939, dated May 26, 1903.

Application filed December 18, 1902. Serial No. 135,758. (No model.)

*To all whom it may concern:*

Be it known that I, AUGUST KRANTZ, a citizen of the United States, residing at Springlake, in the county of Isanti and State of Minnesota, have invented certain new and useful Improvements in Animal-Pokes; and I do hereby declare the following to be a full, clear, and exact description of the invention, such as will enable others skilled in the art to which it appertains to make and use the same.

My invention has for its object to provide an improved animal-poke for preventing animals, and especially cattle, from jumping over fences and other inclosures.

To the above ends the invention consists of the novel devices and combinations of devices hereinafter described, and defined in the claim.

Hitherto, so far as I am aware, these animal-pokes have been attached to the animal's head or have been in the form of a flat frame attached around the neck. The latter of these devices have been usually found very inefficient, and the former, while possibly quite efficient in some cases, interfere materially with the animal's grazing and are objectionable for other reasons.

By observation I have learned that cows, horses, and similar animals before they jump a fence will crowd with their breasts close up to the same and will then raise on their hind legs in order to make the leap. Hence in carrying out this invention I provide a hook or bent stop which is suitably suspended from the animal's neck in front of his breast.

The device is illustrated in the accompanying drawings, wherein like characters indicate like parts throughout the several views.

Figure 1:
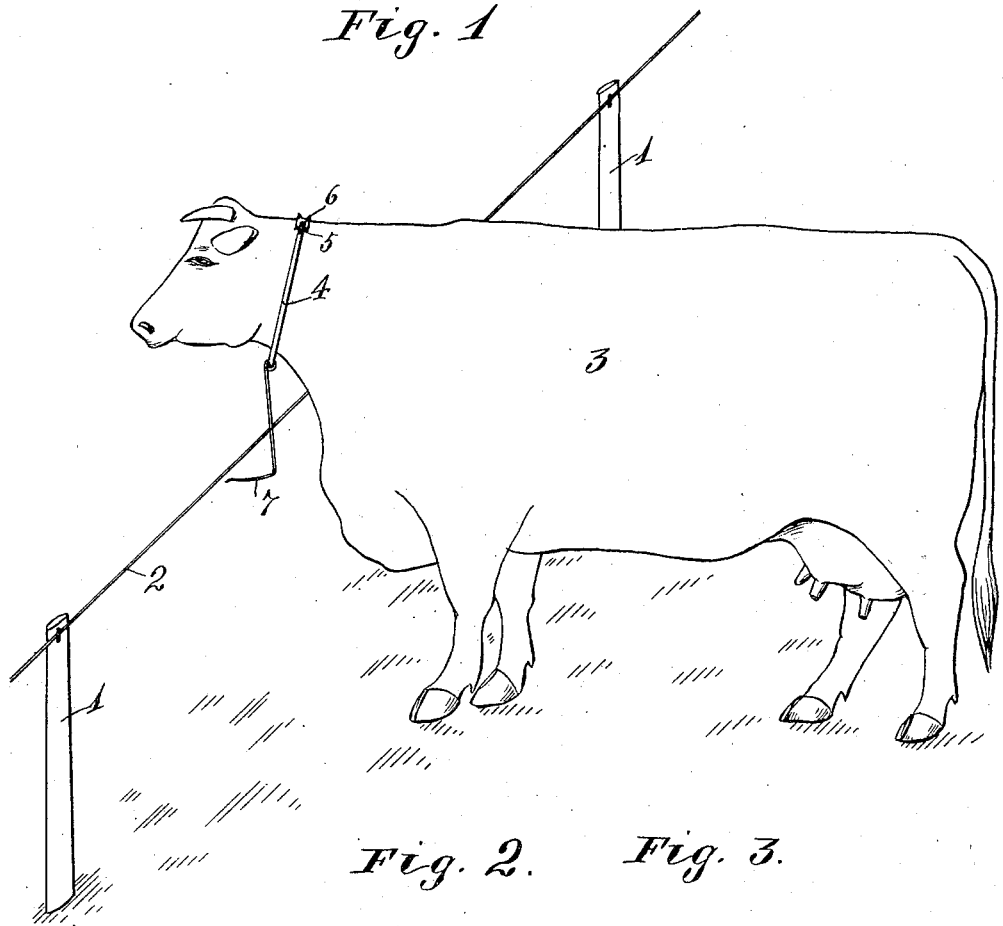
Figures 2, 3:
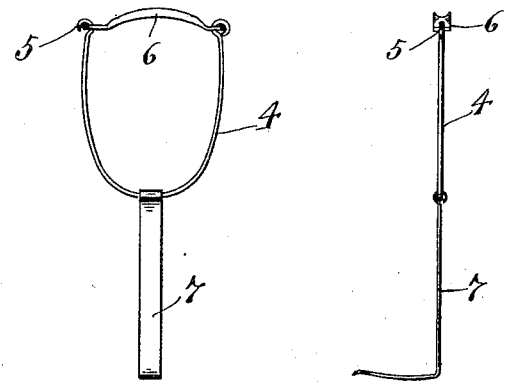

Figure 1 is a perspective view showing the improved poke applied to a cow. Fig. 2 is a rear elevation of the poke removed from working position, and Fig. 3 is a side elevation of the same.

The numeral 1 indicates the posts, and the numeral 2 one of the wires, of a wire fence. The numeral 3 indicates a cow.

Referring to the parts of the device, the numeral 4 indicates a spring-yoke, one end of which is hooked at 5 and to the other end of which is pivoted a tie-strap 6, which at its free end is perforated for interlocking engagement with the said hook 5. To the lower bowed portion of the yoke 4 is loosely pivoted the upper end of a depending angular stop or hook 7. The laterally bent or hooked end of the part 7 projects forward or away from the animal's breast, as shown in Fig. 1. Hence when the animal crowds against the fence the depending end of the hook or stop will catch in the fence and prevent the animal from rising on its hind legs. As is evident, this will effectually prevent the animal from jumping or leaping over the fence. By actual usage of the device on cattle I have found the same to be extremely efficient for the purposes had in view.

What I claim, and desire to secure by Letters Patent of the United States, is as follows:

An animal-poke comprising the spring-yoke 4 having the hooked end 5, the strap 6 pivoted to the other end of said yoke and interlocked with the hooked end thereof, and the depending hook 7 formed of flat material, loosely pivoted to the lower bowed portion of said hook, and having at its depending end a portion that projects therefrom at approximately a right angle, the said strap 7 being held by its pivotal connection with the said yoke so that it will not twist or turn axially with respect thereto, substantially as described.

In testimony whereof I affix my signature in presence of two witnesses.

AUGUST KRANTZ.

Witnesses:
F. F. MURRAY,
C. E. FARR.